(12) United States Patent
Liang et al.

(10) Patent No.: US 8,432,379 B2
(45) Date of Patent: *Apr. 30, 2013

(54) STYLUS

(75) Inventors: Shi-Xu Liang, Shenzhen (CN);
Chung-Yeh Sa, Santa Clara, CA (US)

(73) Assignees: Shenzhen Futaihong Precision Industry Co., Ltd., Shenzhen (CN);
FIH (Hong Kong) Limited, Kowloon (HK)

( * ) Notice: Subject to any disclaimer, the term of this patent is extended or adjusted under 35 U.S.C. 154(b) by 228 days.

This patent is subject to a terminal disclaimer.

(21) Appl. No.: 12/848,343

(22) Filed: Aug. 2, 2010

(65) Prior Publication Data
US 2011/0261025 A1    Oct. 27, 2011

(30) Foreign Application Priority Data
Apr. 23, 2010  (CN) .......................... 2010 1 0154556

(51) Int. Cl.
*G06F 3/041* (2006.01)
(52) U.S. Cl.
USPC ......................................... 345/179; 345/173

(58) Field of Classification Search .................. 401/55,
401/99, 100, 104–107, 196, 197, 202, 208,
401/209, 213, 192, 195, 243; 708/107; 345/179,
345/173, 174, 175, 176; 700/94; 178/19.01,
178/19.03, 19.04
See application file for complete search history.

(56) References Cited

U.S. PATENT DOCUMENTS

| | | | | |
|---|---|---|---|---|
| 7,195,415 | B1 * | 3/2007 | Vial | 401/216 |
| RE40,272 | E * | 4/2008 | Chan | 401/131 |
| 8,147,159 | B2 * | 4/2012 | Glesser et al. | 401/195 |
| 2005/0057535 | A1 * | 3/2005 | Liu et al. | 345/179 |
| 2010/0302213 | A1 * | 12/2010 | Yeh | 345/179 |

* cited by examiner

*Primary Examiner* — Kent Chang
*Assistant Examiner* — Nelson Rosario
(74) *Attorney, Agent, or Firm* — Altis Law Group, Inc.

(57) ABSTRACT

A stylus comprises a housing, a stylus body and an elastic element. The housing has a receptacle longitudinally defined therethrough. The stylus body is hinged to housing and located in the receptacle. The elastic element is located between the housing and the stylus body. When the stylus body rotates relative to the housing from a retracted state to a tilted state, the elastic element is compressed and accumulate elastic force for restore the stylus to the retracted state.

3 Claims, 5 Drawing Sheets

STYLUS

CROSS-REFERENCE TO RELATED APPLICATIONS

This application is related to co-pending U.S. patent applications Ser. Nos. 12/848,330, 12/848,334, 12/848,337, entitled "STYLUS", by Liang et al. These application have the same assignee as the present application and have been concurrently filed herewith. The above-identified applications are incorporated herein by reference.

BACKGROUND

1. Technical Field

This exemplary disclosure generally relates to retractable/extendable styluses.

2. Description of Related Art

It is well-known that a variety of devices include a touch screen. Examples of such devices include smart phones, personal digital assistants (PDA), pagers, personal organizers, and the like. These devices typically include a display module under the touch screen. The display module generates target images associated with menu options, programs, user choices, and other operations. The user controls the device by pressing the touch screen over the target image with a stylus. However, typical styluses can be inconvenient to retract or extend.

Therefore, there is room for improvement within the art

BRIEF DESCRIPTION OF THE DRAWINGS

Many aspects of the exemplary stylus can be better understood with reference to the following drawings. The components in the various drawings are not necessarily drawn to scale, the emphasis instead being placed upon clearly illustrating the principles of the exemplary stylus. Moreover, in the drawings, like reference numerals designate corresponding parts throughout the diagrams.

DETAILED DESCRIPTION

In this exemplary embodiment, the stylus is used to contact a touch screen display of an electronic device such as a mobile telephone. The mobile telephone described herein is a representation of the type of wireless communication device that may benefit from the exemplary embodiment. However, it is to be understood that the exemplary embodiment may be applied to any type of hand-held or portable device including, but not limited to, the following devices: radiotelephones, cordless phones, paging devices, personal digital assistants, portable computers, pen-based or keyboard-based handheld devices, remote control units, portable media players (such as an MP3 or DVD player) that have wireless communication capability and the like. Accordingly, any reference herein to the mobile telephone should also be considered to apply equally to other portable wireless electronic devices.

Figure 1:
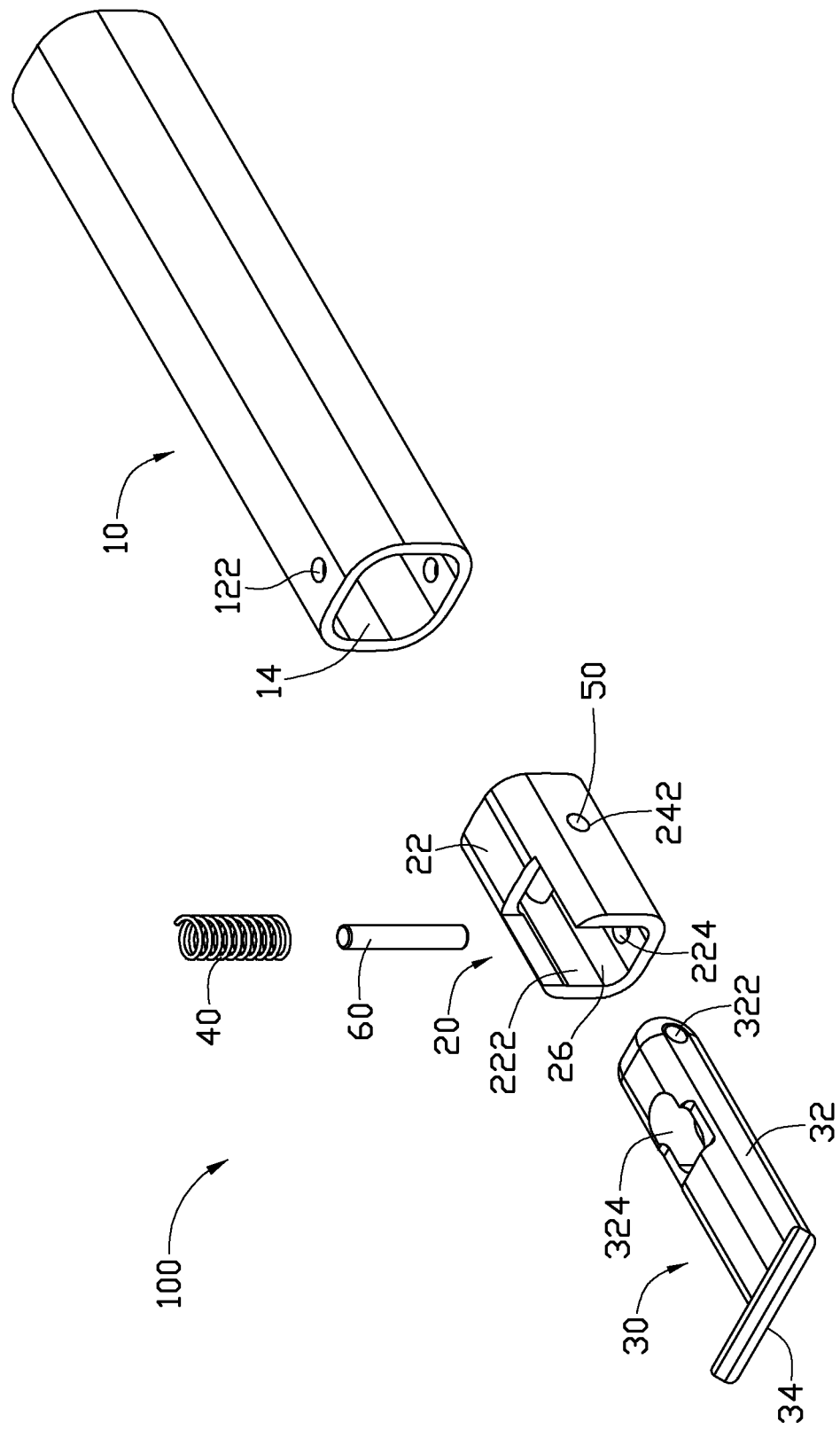
FIG. 1 is an exploded view of an exemplary stylus.
Figure 4:
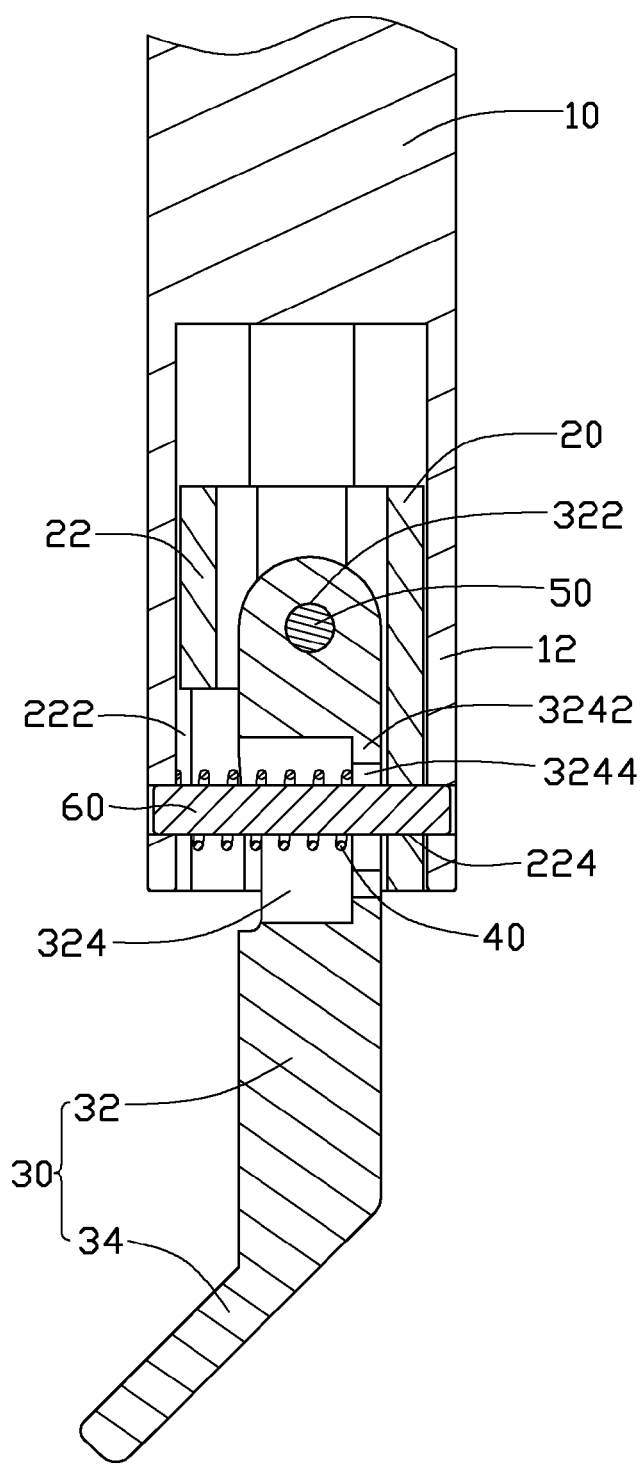
FIG. 4 is a cross-sectional view of the stylus in FIG. 3 along the line IV-IV, and wherein the stylus is in a retracted state.

Referring to FIGS. 1 and 4, a stylus 100 includes a housing 10, a shell 20, a stylus body 30 and an elastic element 40. The stylus body 30 is rotatably mounted to the shell 20 by a pin 50. The elastic element 40 is mounted between the stylus body 30 and the housing 10 to restore the stylus body 30 to its original state. In this exemplary embodiment, a post 60 is retained on the housing 10, and the elastic element 40 is wrapped on the post 60 so the elastic element 40 is firmly positioned between the stylus body 30 and the housing 10.

Figure 2:
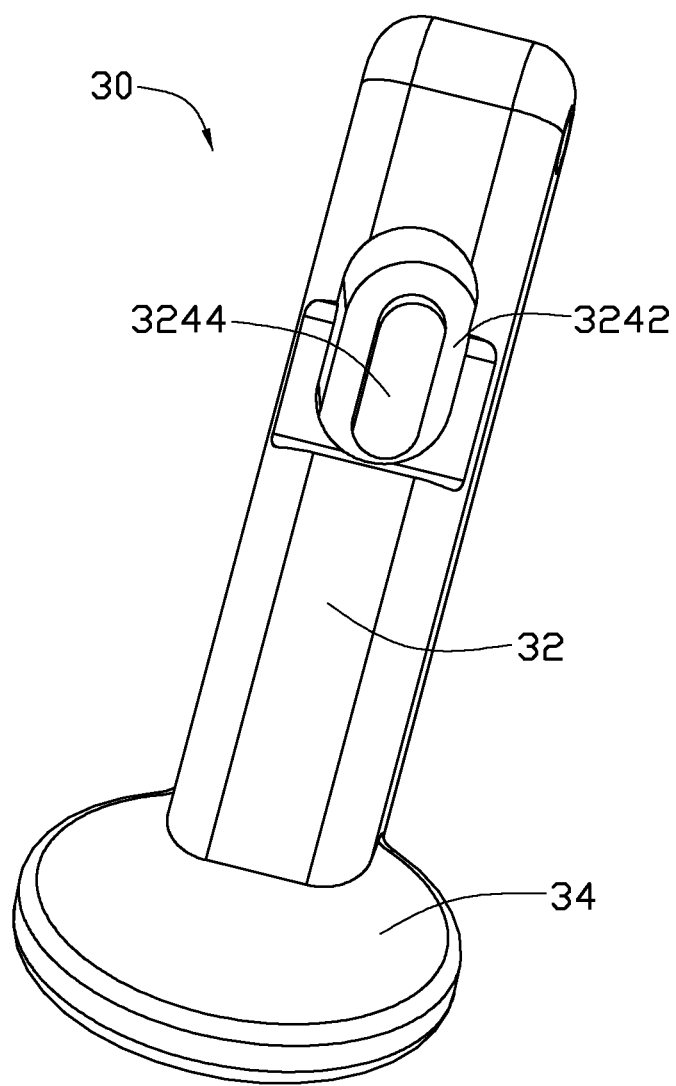
FIG. 2 is an enlarged view of a stylus body shown in FIG. 1.

Referring to FIGS. 1, 2 and 4, the housing 10 is tubular, and includes a receptacle 14 defined longitudinally therethrough and two aligned retaining holes 122 defined near one end thereof. The retaining holes 122 are for retaining the post 60 on the housing 10.

Referring to FIGS. 1 and 4, the shell 20 is tubular, and includes a peripheral wall 22 that encloses a chamber 26. The shell 20 defines two aligned securing holes 242 therethrough and located near one end thereof. The securing holes 242 are for retaining the pin 50 on the shell 20. The shell 20 further has a notch 222 and an opening 224 defined near anther end thereof, and the notch 222 faces the opening 224. The notch 222 provides a tilting space for the stylus body 30 tilting relative to the shell 20 (see FIG. 5). To retain the shell 20 in the housing 10, the opening 224 is aligned with the retaining holes 122, and the post 60 is inserted in the retaining holes 122 and the opening 224 so the shell 20 is retained to the housing 10.

Referring to FIGS. 1 and 4, the stylus body 30 is received within the chamber 26 of the shell 20 and partially extends out of the housing 10. The stylus body 30 is used to contact a touch screen display of an electronic device (now shown). The stylus body 30, in this embodiment, may include a body 32 and a head 34 protruding from a first body end of the body 32. The body 32 has generally the same shape as, but slightly smaller than the chamber 26, so the body 32 can tilt relative to the shell 20. The stylus body 30 further defines an orifice 322 at a second body end thereof for the pin 50 to pass through the stylus body 30. The stylus body 30 further defines a slit 324 near the second body end and a groove 3244 communicating with the slit 324. The slit 324 is larger than the groove 3244 so a shoulder 3242 (FIG. 2) is defined between the slit 324 and the groove 3244. The slit 324 and the groove 3244 are cooperatively for the post 60 to pass through the stylus body 30. The slit 324 and the groove 3244 are both larger than the post 60 so the stylus body 30 can freely tilt relative to the shell 20.

Figure 5:
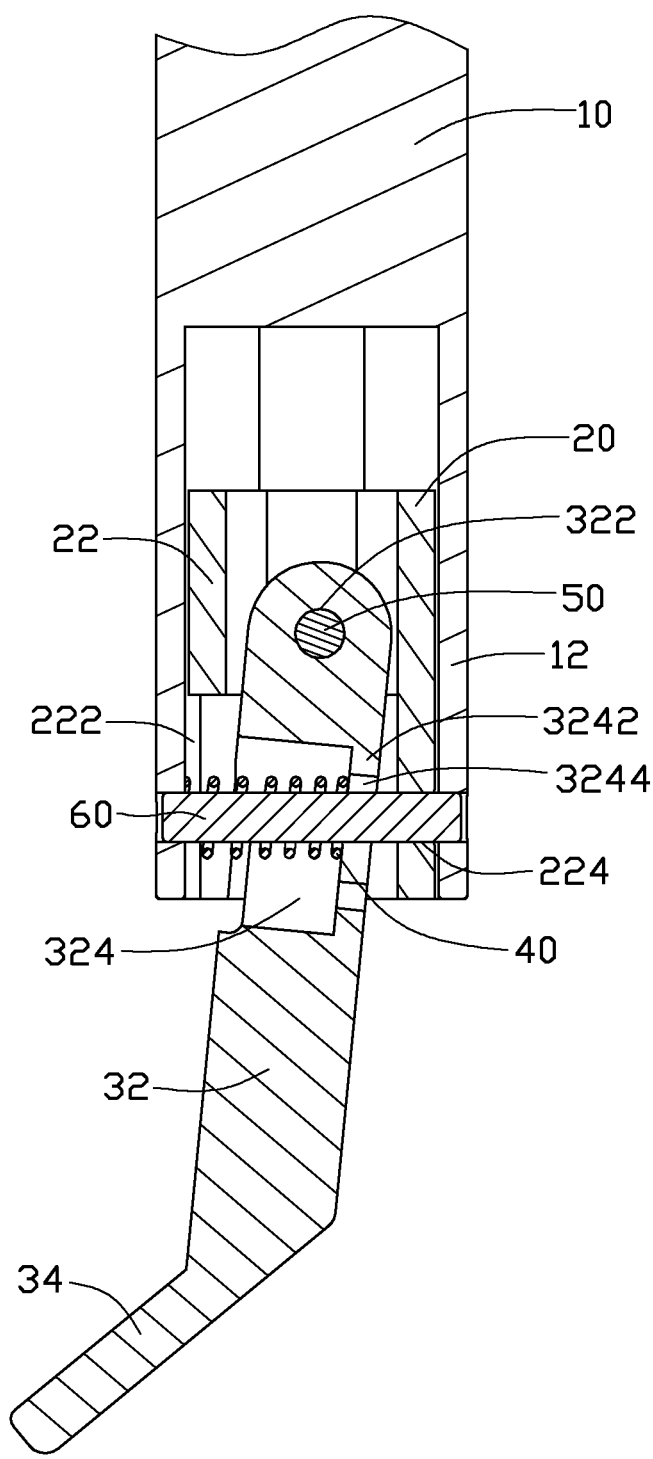
FIG. 5 is similar to FIG. 4, but showing the stylus in a tilted state.

Referring to FIGS. 4 and 5, the elastic element 40, in this exemplary embodiment, is a compressed spring wrapped around the post 60 and resisted between the housing 10 and the shoulder 3242. When the stylus body 30 tilts relative to the housing 10, the elastic element 40 is compressed to accumulate elastic force for restore the stylus body 30 to a retracted state like shown in FIG. 4.

Figure 3:
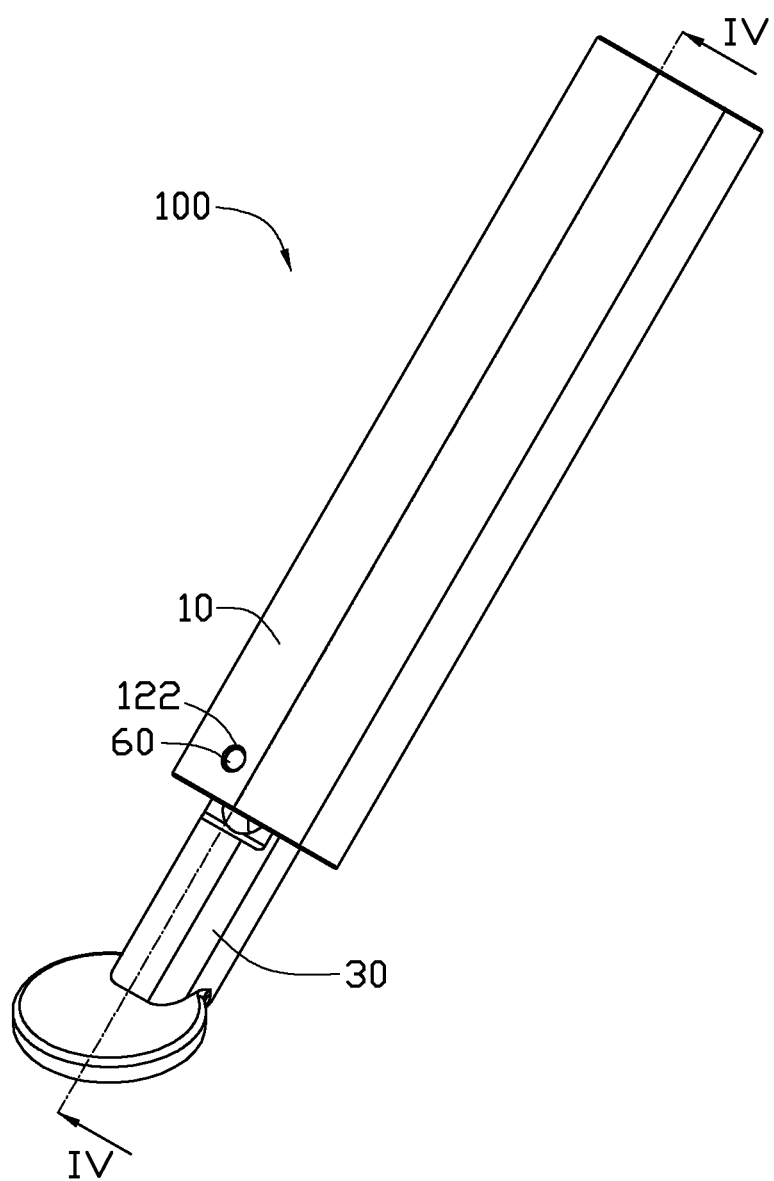
FIG. 3 is an assembled view of the stylus shown in FIG. 1.

Referring to FIGS. 1 and 3-4, in assembly, the stylus body 30 is inserted in the chamber 26 until the orifice 322 is aligned with the securing holes 242 and the slit 324 is aligned with the opening 224. The pin 50 is inserted in the securing holes 242 and the orifice 322 to hinge the stylus body 30 to the shell 20. The shell 20 is inserted in the receptacle until the opening 224 is aligned with the retaining holes. The elastic element 40 is mounted between the shoulder 3242 and the housing 10. The post 60 is inserted in the retaining holes, the elastic element 40, the slit 324, the groove 3244 so the shell 20 is mounted in the receptacle 14 and the elastic element 40 is firmly located between the stylus body 30 and the housing 10, to finish assembling a completed stylus 100.

Referring to FIGS. 4-5, in use, the stylus body 30 rotates about the pin 50 so the stylus body 30 tilts relative to the housing 10 until the stylus body 30 is located in a tilted state like shown in FIG. 5. When the stylus body 30 is in the tilted state shown in FIG. 5, the elastic element 40 is compressed and accumulates elastic force for the stylus body 30 to restore the stylus body 30 to the retracted state shown in FIG. 4.

It is understood that the housing 10 and the shell 20 can be integrated in to one housing 10 assembly in which the shell 20 may be omitted and the pin 50 directly defined in the housing 10.

It is to be further understood that even though numerous characteristics and advantages of the exemplary embodiments have been set forth in the foregoing description, together with details of structures and functions of various embodiments, the disclosure is illustrative only, and changes may be made in detail, especially in matters of shape, size, and arrangement of parts within the principles of the exemplary invention to the full extent indicated by the broad general meaning of the terms in which the appended claims are expressed.

What is claimed is:

1. A stylus, comprising:
    a housing;
    a shell;
    a stylus body rotatably connected with the shell and being capable of tilting relative to the housing along an axis perpendicularly to the longitudinal axis of the housing, the shell and the stylus body together received in the receptacle, a post extending through the housing, the shell and the stylus body to hold the shell and the stylus body in the housing; and
    an elastic element wrapped around the post and configured to accumulate elastic force to bias the stylus body with the tilting of the stylus body relative to the housing from an original state to a tilting state;
    wherein the shell includes a peripheral wall that encloses a chamber, the stylus body is accommodated in the chamber, the peripheral wall defines a notch and an opening at one end thereof, the opening faces the notch; the stylus body defines a slit and a groove communicating with each other, the housing defines two aligned retaining holes aligned with the opening; the post extends through one of the retaining holes, the notch, the slit, the groove, the opening, and the other of the retaining holes to hold the stylus body and the shell on the housing.

2. The stylus as claimed in claim 1, wherein the shell defines two aligned securing holes through the peripheral at another end thereof, the stylus body defines an orifice aligned with the securing holes, the pin is retained in the securing holes and the orifice.

3. The stylus as claimed in claim 2, wherein the slit is larger than the groove so a shoulder is defined between the slit and the groove, the elastic element extends through the notch and the slit, and is resisted between the shoulder and the housing.

* * * * *